United States Patent Office 3,414,565
Patented Dec. 3, 1968

3,414,565
3,5-CYCLO-6β,19-OXIDO STEROIDS AND PROCESSES FOR THEIR PREPARATION
Samuel Ladabaum, Mexico City, Mexico, assignor to Syntex Corporation, Panama, Panama, a corporation of Panama
No Drawing. Filed May 6, 1963, Ser. No. 278,413
Claims priority, application Mexico, May 7, 1962, 67,279
11 Claims. (Cl. 260—239.55)

ABSTRACT OF THE DISCLOSURE

Novel 3,5-cyclo-6β,19-oxido steroids which are useful for the preparation of the corresponding known and useful 19-nor steroids and which are also anabolic-androgenic, progestational, and anti-inflammatory agents and processes for the preparation of such compounds.

---

The present invention refers to a novel process for the preparation of derivatives of cyclopentanophenanthrene.

More particularly the present invention refers to a novel process for the production of the novel 3,5-cyclo-6β,19-oxido steroids, which are important intermediates in the production of the corresponding 19-nor compounds of great therapeutic importance known to the skilled in the art.

In prior patents U.S. Patents Nos. 3,065,228, 3,033,862, 3,036,068 and 3,001,989, there have been set forth several methods for the production of a 6β,19-oxide bridge in different types of compounds. According to the present invention the discovery has been made that the formation of a 6β,19-oxido group is also possible starting with a 3,5-cyclo-6β-hydroxy steroid. The obtained 3,5-cyclo-6β, 19-oxido steroids have a special interest as intermediate products in the obtainment of 19-nor-steroids, for they produce easily, by hydrolysis in the presence of acids, the corresponding steroids with the $\Delta^5$-3β,19β-diol grouping, which may be transformed by easy conventional methods in to the corresponding 19-nor derivatives.

The new compounds object of the present invention are represented by the following formulae:

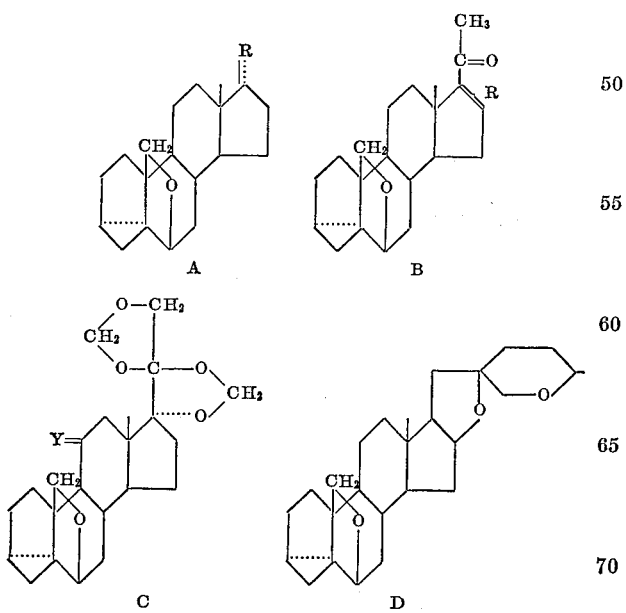

In the above formulae R represents a ketonic group, an hydroxyl group or an acyloxy group; Q may be a double bond or the group

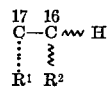

wherein R' represents hydrogen, hydroxyl or a hydrocarbon carboxylic acyloxy group or less than 12 carbon atoms; $R^2$ represents hydrogen, α-methyl or β-methyl, $R^1$ and $R^2$ together represent the group

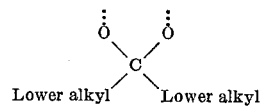

Y represents

or =O.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethyl-acetate, t-butylacetate phenoxyacetate, cyclopentyl-propionate, aminoacetate and β-chloropropionate.

In addition to being important intermediates, the compounds represented by formula A are useful anabolic-androgenic agents, those represented by formula B are potent progestational compounds with good oral activity and the compounds represented by formula C have anti-inflammatory activity, especially when used topically.

The obtainment of the novel compounds of the present invention, and the transformation thereof into $\Delta^5$-3β,19-diols are represented by the following scheme:

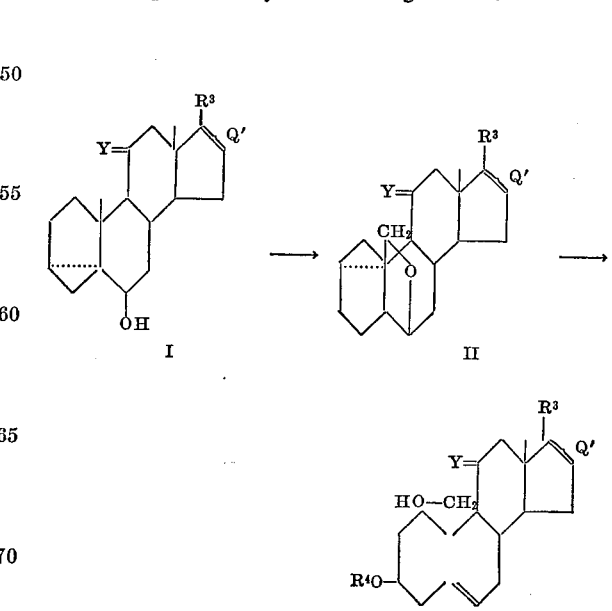

In the above formulae Q' may be a double bond or the group

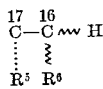

wherein $R^5$ represents hydrogen or a hydrocarbon carboxylic acyloxy group of less than 12 carbon atoms; $R^6$ represents hydrogen, α-methyl or β-methyl; $R^5$ and $R^6$ together represent the group

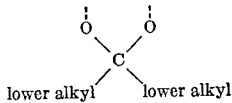

$R^3$ represents an acyloxy group derived from an acid of the above defined type, a ketone, an acetyl group or a dihydroxy acetone side chain protected by a 17,20;20,21-bismethylenedioxy group; $R^3$ and Q' together represent a sapogenin side chain; when Q' is a double bond $R^3$ is an acetyl group; $R^4$ may be hydrogen or a hydrocarbon carboxylic acyl group of less than 12 carbon atoms; Y has the same meaning as defined above.

The starting compound (I) of the process just outlined is obtained by conventional methods, namely by tosylating the corresponding 3β-hydroxy-Δ⁵-steroid with tosyl chloride in pyridine, and hydrolyzing the resulting 3-tosylate in the presence of potassium acetate preferably in an aqueous acetone medium, to give the 3,5-cyclo-6β-hydroxy derivatives. The starting compound (I) may be any 3,5-cyclo-6β-hydroxy-steroid having no other free hydroxyls in the molecule. At C–17 may be present preferably a ketone, a 17β-acyloxy group, a 17β-acetyl group with or without an acyloxy group at C–17α, a dihydroxy acetone side chain protected by a 17,20;20,21-bismethylenedioxy group, a sapogenin side chain and other similar substituents. In addition there may be other groups in the starting molecule which do not interfere with the reactions, as for example, when there exists an acetyl substituent at C–17β there may be present a double bond between C–16 and C–17 or a 16α,17α-diol, preferably protected by an acetonide group; an 11-ketone, preferably in the case of compounds with a 17β-dihydroxy acetone chain; a methyl at 16α or 16β, halogen atoms in positions 9α and 21 and other similar substituents.

Examples of suitable starting materials are 3,5-cyclo-androstan-6β-ol-17-one, 3,5-cyclo-pregnan-6β-ol-20-one, 1a 3,5-cyclo-Δ¹⁶-pregnen-6β-ol-20-one, 17,20;20,21-bismethylenedioxy-3,5-cyclo-pregnan-6β-ol-11-one, 17,20;20,21-bismethylenedioxy-3,5-cyclo-pregnan-6β-ol, the 17-acetate of 3,5-cyclo-pregnane-6β,17α-diol-20-one, 16α-methyl - 3,5 - cyclo-pregnan-6β-ol-20-one, 16β-methyl-3,5-cyclo-pregnan-6β-ol-20-one, the 17-acetate of 16α-methyl-3,5-cyclo-pregnane-6β,17α-diol-20-one. 16α,17α-isopropylidenedioxy 3,5-cyclo-pregnan-6β-ol-20-one, the 17-acetate of 16β-methyl 3,5-cyclo-pregnane-6β,17α-diol-20-one, the 17-acetate of 3,5-cyclo-androstane-6β,17β-diol and i-diosgenin.

Proceeding in accordance with the above equation the starting compound (I) is treated with a salt of a cation with reduction potential higher than +0.3 v. with respect to its nearest reduced state, preferably higher than +0.7 v. and particularly lead tetraacetate (S. Glasstone, Textbook of Physical Chemistry, D. Van Nostrand Company Inc., second edition, 1952, pp. 939, 940) in a nonpolar solvent, preferably at reflux temperature for a period of time of 1 to 35 hours, optionally in the presence of a weak base such as calcium carbonate, thus giving the corresponding 3,5-cyclo-6β,19-oxido derivative (II). In this step there are preferably used the acylates of the defined cations, as for example (in addition to the already mentioned lead tetraacetate) mercury diacetate, silver acetate, gold acetate and similar compounds. The nonpolar solvents utilized suitably in this step may be aromatic solvents such as benzene, toluene or xylene; ethers such as dioxan or tetrahydrofuran; halogenated hydrocarbons such as carbon tetrachloride, methylene chloride and similar solvents. The 3,5-cyclo-6β,19-oxido-steroids when treated with mineral acids such as sulfuric acid or with strong organic acids such as p-toluenesulfonic acid or trichloro acetic acid preferably in catalytic quantities, i.e. with 0.01 to 10% of weight of acid with respect to the total amount of solvent and steroid, preferably in a polar solvent, give the corresponding Δ⁵-3β,19-dihydroxy derivatives. When in this step there are utilized, solvents donors of acylate anions, such as the hydrocarbon carboxylic acids of less than 12 carbon atoms, either alone or in an inert solvent such as dioxan or ethyl acetate, there are produced the corresponding 3β-acyloxy-19-hydroxy-Δ⁵-derivatives (III; $R^4$=acyl), when there are utilized sources of hydroxyl anions, such as water or lower alkanols or solutions thereof in organic solvents difficulty dissociated, such as dioxan, tetrahydrofuran and similar compounds, there are obtained the corresponding 3β,19-dihydroxy-Δ⁵-derivatives (III; $R^4$=H). The latter reaction may be carried out within wide limits, for example the temperature may range between approximately 0° C. to the boiling point of the reaction mixture and the time may vary between, approximately 1 and 24 hours.

The 3,5-cyclo-6β,19-oxido-steroids (II) may also be transformed into the corresponding derivatives having the 3β,19-hydroxy-Δ⁵-grouping, when treated with hydrolyzing agents of oxidic bridges, such as acetic anhydride in the presence of a Lewis acid, preferably boron trifluoride etherate, preferably at about 0° C. for approximately 15 minutes to 1 hour, whereby there are obtained the 3.5-cyclo-6β,19-dihydroxy derivatives which are transformed by hydrolysis in an acid medium, e.g. including imneral acids or strong organic acids, and without being necessarily isolated, into the desired 3β,19-dihydroxy Δ⁵-derivatives (III).

The Δ⁵-3β,19-dihydroxy-compounds may be converted into the corresponding 19-nor derivatives by conventional methods. For example, they may be oxidized by the Oppenauer method to the corresponding Δ⁴-19-al-3-ones which by alkaline treatment produce the 19-nor-Δ⁴-3-ketones. Another alternative way for the obtainment of 19-nor-compounds from the Δ⁵-3,19-diols, comprises conventional bromination, to give the 5α,6β-dibromo-3,19-diols followed by oxidation e.g. with Jones' reagent, to produce the 5α,6β-dibromo-3-one-19-oic acids which by debromination with zinc in acetic acid give the Δ⁴-3-one-19-oic acids which may be easily decarboxylated in the presence of a mineral acid, thus being obtained the corresponding 19-nor-Δ⁴-3-ketones. The application of these conventional procedures to the intermediate compounds object of the present invention makes possible the production of important 19-nor derivatives as for example 19-nor-Δ⁴-androstene-3,17-dione, 19-nor-Δ⁴-androsten-17β-ol-3-one, 19-nor progesterone, 19-nor-17α-hydroxy-progesterone, etc., which in turn may serve as starting compounds in the preparation of other important 19-nor-derivatives known to the skilled in the art, as for example 17α-ethinyl-19-nor-testosterone, etc.

The following specific examples serve to illustrate the present invention but are not intended to restrict the scope thereof.

Preparation 1.—To a solution of 5 g. of cortisone in 200 cc of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21 - bismethylenedioxy - $\Delta^4$ - pregnene-3,11-dione.

A solution of 5 g. of the above compound in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium biocarbonate solution and finally with water. There was thus obtained 3-acetoxy-17, 20;20,21-bismethylenedioxy-$\Delta^{3,5}$-pregnadien-11-one.

A solution of 5 g. of the preceding compound in a mixture of 100 cc. of 95% ethanol and 35 cc. of tetrahydrofuran was cooled to 10° C. and added dropwise, with occasional stirring over a 1 hour period, to a cold solution of 6 g. of sodium borohydride in 50 cc. of 80% ethanol, the reaction temperature not being allowed to exceed 5° C. After completion of addition, the solution was kept at 0–5° C. for 2 hours further; then 200 cc. of 10% sodium hydroxide was added and the solution boiled for 15 minutes. Most of the solvent was removed in vacuo, the residue acidified with 20% hydrochloric acid and the crystalline precipitate collected and washed. Recrystallization of the crude material from acetone furnished 17,20; 20.21-bismethylenedioxy-$\Delta^5$-pregnen-3$\beta$-ol-11-one.

Preparation 2.—Reichstein's compound "S" was treated by the same techniques as described on the preceding preparation, producing consecutively: 17,20;20,21-bismethylenedioxy-$\Delta^4$-pregnen-3-one, 3-acetoxy-17,20; 20,21-bismethylenedioxy-$\Delta^{3,5}$-pregnadiene, 17,20;20,21-bismethylenedioxy-$\Delta^5$-pregnen-3$\beta$-ol.

Preparation 3.—2 g. of the diacetate of 16$\alpha$-methyl-$\Delta^5$-pregnen-3$\beta$,17$\alpha$-diol-20-one was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing the 17-acetate of 16$\alpha$-methyl-$\Delta^5$-pregnene-3$\beta$,17$\alpha$-diol-20-one.

Preparation 4.—A mixture of 6.6 g. of 16$\beta$-methyl-pregnenolone 2.7 g. of p-toluenesulfonic acid and 300 cc. of acetic anhydride was submitted to a slow distillation; during 5 hours. The residue was cooled and poured into iced water. The product was then extracted with ether, the extract washed successively with an aqueous solution of sodium carbonate and water to neutral, dried and evaporated to dryness. The residue consisted of 3,20-diacetoxy-16$\beta$-methyl-$\Delta^{5,17(20)}$-pregnadiene which was utilized in the following step without purification.

6 g. of this crude 3$\beta$,20-diacetoxy compound were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with an aqueous solution of sodium bicarbonate, then with water, dried with anhydrous sodium sulfate and evaporated to dryness. The residue consisted of the crude 3$\beta$,20-diacetoxy-16$\beta$-methyl-5$\alpha$,6$\alpha$-17$\alpha$,20$\alpha$-bis-oxido-pregnane.

This crude oxido compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding the 3-acetate of 16$\beta$-methyl-5$\alpha$,6$\alpha$-oxido-pregnane-3$\beta$,17$\alpha$-diol-20-one.

To 5 g. of the latter compound in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded the 3-acetate of 16$\beta$-methyl-$\Delta^5$-pregnene-3$\beta$,17$\alpha$-diol-20-one.

To a solution of 4.5 g. of the latter steroid in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the diacetate of 16$\beta$-methyl-$\Delta^5$-pregnene-3$\beta$,17$\alpha$-diol-20-one.

The latter diacetate was treated according to preparation 3, thus giving the 17-acetate of 16$\beta$-methyl-$\Delta^5$-pregnene-3$\beta$,17$\alpha$-diol-20-one.

Preparation 5.—2 cc. of dihydropyrane were added to a solution of 1 g. of $\Delta^5$-androsten-3$\beta$-ol-17-one in 15 cc. of benzene and about 1 cc. was distilled to remove moisture. 0.4 g. of p-toluenesulfonic acid was added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of $\Delta^5$-androsten-3$\beta$-ol-17-one.

A solution of 1 g. of sodium borohydride in 3 cc. of water was added to an ice-cooled solution of 1 g. of the above ether in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give the 3-tetrahydropyranylether of $\Delta^5$-androstene-3$\beta$,17$\beta$-diol.

A mixture of the latter product 4 cc. of pyridine and 2 cc. of acetic anhydride was kept at room temperature overnight, poured into ice water, the formed precipitate was filtered, washed with water and dried. Crystallization from acetone-hexane gave the 3-tetrahydropyranylether-17-acetate of $\Delta^5$-androstene-3$\beta$,17$\beta$-diol.

To a solution of the latter product in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded the 17-acetate of $\Delta^5$-androstene-3$\beta$,17$\beta$-diol.

Example 1.—A solution of 5 g. of $\Delta^5$-androsten-3$\beta$-ol-17-one in 25 cc. of pyridine was treated with 2.5 g. of tosyl chloride and kept at room temperature for 24 hours, it was then diluted with water and the precipitate separated by filtration, thus giving the tosylate of $\Delta^5$-androsten-3$\beta$-ol-17-one.

A mixture of 4 g. of the above tosylate 6 g. of potassium acetate, 120 cc. of acetone and 100 cc. of water was refluxed for 6 hours. Then is was diluted with water and extracted with ethyl acetate. The organic extract was washed with water, dried over anhydrous sodium sulfate and evaporated to dryness. The residue was recrystallized from methylene chloride-methanol, to give 3,5-cyclo-androstan-6$\beta$-ol-17-one.

The compounds listed under I, were treated by the above techniques, giving first the corresponding 3-tosylates and finally the compounds set forth under II.

| I | II |
|---|---|
| Pregnenolone | 3,5-cyclo-pregnan-6β-ol-20-one. |
| Δ5,16-pregnadien-3β-ol-20-one | 3,5-cyclo:Δ16-pregnen-6β-ol-20-one. |
| 17,20;20,21-bismethylene-dioxy-Δ5-pregnen-3α-ol-11-one | 17,20;20,21-bismethylene-dioxy-3,5-cyclo-pregnan-6β-ol-11-one. |
| 17,20;20,21-bismethylene-dioxy-Δ5-pregnen-3α-ol | Do. |
| Δ5-pregnene-3α,17α-diol-20-one 17-acetate | 3,5-cyclo-pregnane-6β,17α-diol-20-one 17-acetate. |
| 16α-methyl-Δ5-pregnen-3β-ol-20-one | 16α-methyl-3,5-cyclo-pregnan-6β-ol-20-one. |
| 16β-methyl-Δ5-pregnen-3β-ol-20-one | 16β-methyl-3,5-cyclo-pregnan-6β-ol-20-one. |
| 16α-methyl-Δ5-pregnene-3β,17α-diol-20-one 17-acetate | 16α-methyl-3,5-cyclo-pregnane-6β,17α-diol-20-one 17-acetate. |
| 16α,17α-isopropylidenedioxy-Δ5-pregnen-3β-ol-20-one | 16α,17α-isopropylidenedioxy-3,5-cyclo-pregnan-6β-ol-20-one. |
| 16α-methyl-Δ5-pregnene-3β,17α-diol-20-one-17-acetate | 16β-methyl-3,5-cyclopregnane-6β,17,α-diol-20-one-17-acetate. |
| Δ5-androstene-3β,17β-diol-17-acetate | 3,5-cyclo-androstane-6β,17β-diol-17-acetate. |
| diosgenin | i-diosgenin. |

Example 2.—To a solution of 4 g. of 3,5-cyclo-androstan-6β-ol-17-one, in 150 cc. of dry benzene, were added 6 g. of lead tetraacetate and 3 g. of sodium carbonate and the mixture was refluxed for 18 hours. It was cooled, filtered, water was added to the filtrate, the benzene layer was separated, washed with water and the benzene was evaporated under reduced pressure; upon chromatography of the residue on neutral alumina, there was obtained 6β,19-oxido-3,5-cycloandrostan-17-one.

The rest of the compounds obtained in Example I, were treated in the same manner, thus giving respectively the compounds specified hereinafter:

6β,19-oxido-3,5-cyclo-pregnan-20-one
6β,19-oxido-3,5-cyclo-Δ16-pregnen-20-one
17,20;20,21-bismethylenedioxy-6β-19-oxido-2,5-cyclo-pregnan-11-one
17,20;20,21-bismethylenedioxy-6β-19-oxido-3,5-cyclo-pregnane
6β,19-oxido-3,5-cyclo-pregnan-17α-ol-20-one acetate
16α-methyl-6β,19-oxido-3,5-cyclo-pregnan-20-one
16β-methyl-6β,19-oxido-3,5-cyclo-pregnan-20-one
16α-methyl-6β,19-oxido-3,5-cyclo-pregnan-17α-ol-20-one acetate
16α,17α-isopropylidenedioxy-6β,19-oxido-3,5-cyclo-pregnan-20-one
16β-methyl-6β,19-oxido-3,5-cyclo-pregnan-17α-ol-20-one acetate
6β,19-oxido-3,5-cyclo-androstan-17β-ol-acetate
6β,19-oxido-3,5-cyclo-22a-spirostane Example 3.—1 g. of 6β,19-oxido-3,5-cyclo-androstan-17-one was dissolved in 50 cc. of acetic acid, there was added 0.1 cc. of concentrated sulfuric acid and the mixture was maintained at ambient temperature for 24 hours. Then it was diluted with water, and the formed precipitate was separated by filtration, washed with water to neutral and dried under vacuum. Crystallization from acetone-hexane produced the 3-acetate of Δ5-androstene-3β,19-diol-17-one.

The rest of the compounds obtained in Example 2, were treated by the same method, yielding respectively the following products:

The 3-acetate of Δ5-pregnene-3β,19-diol-20-one
The 3-acetate of Δ5,16-pregnadiene-3β,19-diol-20-one
The 3-acetate of 17,20;20,21-bismethylenedioxy-Δ5-pregnene-3β,19-diol-11-one
The 3-acetate of 17,20;20,21-bismethylenedioxy-Δ3-pregnene-3β,19-diol
The 3,17-diacetate of Δ5-pregnene-3β,17α,19-triol-20-one
The 3-acetate of 16α-methyl-Δ5-pregnene-3β,19-diol-20-one
The 3-acetate of 16β-methyl-Δ5-pregnene-3β,19-diol-20-one
The 3,17-diacetate of 16α-methyl-Δ5-pregnene-3β-17α,19-triol-20-one
The 3-acetate of 16α,17α-isopropylidenedioxy-Δ5-pregnene-3β,19-diol-20-one
The 3,17-diacetate of 16β-methyl-Δ5-pregnene-3β,17α,19-triol-20-one
The 3-17-diacetate of Δ5-androstene-3β,17β-19-triol
The 3-acetate of 19-hydroxy-diosgenin Example 4.—6β,19 - oxido-3,5-cyclo-androstan-17-one was treated following the procedure of Example 3, except that there was used water instead of acetic acid, thus giving Δ5-androstene-3β,19-diol-17-one.

The rest of the compounds obtained in Example 2, were treated by the same method, giving respectively the following products:

Δ5-pregnene-3β,19-diol-20-one
Δ5,16-pregnadiene-3β,19-diol-20-one
17,20;20,21-bismethylenedioxy-Δ5-pregnene-3β,19-diol-11-one
17,20;20,21-bismethylenedioxy-Δ5-pregnene-3β,19-diol
The 17-acetate of Δ5-pregnene-3β,17α,19-triol-20-one
16α-methyl-Δ5-pregnene-3β,19-diol-20-one
16β-methyl-Δ5-pregnene-3β,19-diol-20-one
The 17-acetate of 16α-methyl-Δ5-pregnene-3β,17α,19-triol-20-one
16α,17α-isopropylidenedioxy-Δ5-pregnene-3β,19-diol-20-one
The 17-acetate of 16β-methyl-Δ5-pregnene-3β,17α,19-triol-20-one
The 17-acetate of Δ5-androstene-3β,17β,19-triol-19-hydroxy-diosgenin Example 5.—3,5-cyclo-androstan - 6β - ol-17-one was treated in the same manner as in Example 2, except that benzene was substituted by toluene and sodium carbonate by potassium carbonate, thus being produced 6β,19-oxido-3,5-cyclo-androstan-17-one.

Example 6.—3,5-cyclo-androstan - 6β - ol-17-one was treated in the same manner as in Example 2, except that benzene was substituted by carbon tetrachloride and the reaction was carried out in the absence of sodium carbonate.

Example 7.—3,5-cyclo-androstan - 6β - ol-17-one was treated according to Example 2, with the exception that lead tetraacetate was substituted by mercury diacetate, thus giving a compound identical to the one of said example.

Example 8.—3,5-cyclo-androstan - 6β - ol-17-one was treated according to Example 2, with the execption that lead tetraacetate was substituted by silver acetate, giving the same product.

Example 9.—Example 2 was repeated, except that lead tetraacetate was substituted by gold acetate and there was not used any sodium carbonate, thus being obtained the same product.

Example 10.—1 g. of 6β,19-oxido-3,5-cyclo-androstan-17-one was dissolved in 50 cc. of acetic acid, there were added 300 mg. of p-toluenesulfonic acid and the mixture was boiled under reflux during 3 hours. Then, it was diluted with water and the formed precipitate separated by filtration, washed with water to neutral and dried under vacuum. Crystallization from acetone hexan yielded the 3-acetate of Δ5-androstene-3β,19-diol-17-one.

Example 11.—6β,19-oxido-3,5-cyclo-androstan-17-one was treated according to Example 10, except that acetic acid was substituted by water, thus being obtained Δ5-androstene-3β,19-diol-17-one.

Example 12.—A mixture of 1 g. of 6β,19-oxido-3,5-cyclo-androstan-17-one, 15 cc. of acetic anhydride and 0.1 cc. of an ether solution of boron trifluoride was maintained at 0° C. during 30 minutes. Then it was poured into water, whereby there precipitated 3,5-cyclo-androstane-6β,19-diol-17-one, the resulting mixture was refluxed stirred during 10 minutes, the formed precipitate was washed to neutral, dried and recrystallized from acetone, thus giving the 3-acetate of $\Delta^5$-androstene-3β,19-diol-17-one.

Example 13.—A solution of 0.17 g. of potassium hydroxide in 0.2 cc. of water and 2.5 cc. of methanol was added over 30 minutes to a boiling solution of 1 g. of the acetate of 6β,19-oxido-3,5-cyclo-pregnane-17α-ol-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 6β,19-oxido-3,5-cyclo-pregnan-17α-ol-20-one.

Following the same method there were treated: the acetate of 16α-methyl-6β,19-oxido-3,5-cyclo-pregnan-17α-ol-20-one, the acetate of 16β-methyl-6β,19-oxido-3,5-cyclo-pregnan-17α-ol-20-one and the acetate of 6β,19-oxido-3,5-cyclo-androstan-17β-ol, thus being respectively produced 16α-methyl-6β,19-oxido-3,5-cyclo-pregnan-17α-ol-20-one, 16β-methyl-6β,19-oxido-3,5-cyclo-pregnan-17α-ol-20-one and 6β,19-oxido-3,5-cyclo-androstan-17β-ol.

Example 14.—6β,19 - oxido-3,5-cyclo-pregnan-20-one was treated according to Example 12, yielding successively 3,5-cyclo-pregnane - 6β,19 - diol-20-one and the 3-acetate of 3,5-cyclo-pregnane-3β,19-diol-20-one.

By treatment of 6β,19-oxido-3,5-cyclo-22a-spirostane by the same procedure there were successively obtained 19-hydroxy-i-diosgenin and 19-hydroxy-diosgenin-3-acetate.

I claim:

1. A compound of the following formula wherein Q is selected from the group consisting of a double bond and the group wherein $R^1$ is selected from the group consisting of hydrogen, hydroxyl and a hydrocarbon-carboxylic acyloxy group of less than 12 carbon atoms; $R^2$ is a member of the group consisting of hydrogen, α-methyl and β-methyl; $R^1$ and $R^2$ together are the group 2. A compound according to claim 1 wherein Q is the group wherein $R^1$ is a hydrocarbon carboxylic acyloxy group of less than 12 carbon atoms and $R^2$ is as therein defined.

3. 6β,19-oxido-3,5-cyclo-$\Delta^{26}$-pregnen-20-one.

4. 16α,17α - isopropylidenedioxy - 6β,19 - oxido-3,5-cyclo-pregnan-20-one.

5. 6β,19 - oxido-3,5-cyclo-pregnane-17α-ol-20-one acetate.

6. 16α - methyl-6β,19-oxido-3,5-cyclo-pregnan-17α-ol-20-one acetate.

7. 16β-methyl - 6β,19 - oxido-3,5-cyclo-pregnan-17β-ol-20-one acetate.

8. A compound of the following formula:

wherein Y is a member of the group consisting of and =O.

9. 17,20;20,21 - bismethylenedioxy - 6β,19 - oxido-3,5-cyclo-pregnan-11-one.

10. 17,20;20,21 - bismethylenedioxy - 6β,19 - oxido-3,5-cyclo-pregnane.

11. 6β,19-oxido-3,5-cyclo-spirostane.

References Cited

Tanable et al., Chem. & Pharm. Bull., vol. 10 (1962), pp. 1126–1127 relied on.

H. A. FRENCH, *Primary Examiner.*

UNITED STATES PATENT OFFICE
CERTIFICATE OF CORRECTION

Patent No. 3,414,565                                                  December 3, 1968

Samuel Ladabaum

It is certified that error appears in the above identified patent and that said Letters Patent are hereby corrected as shown below:

Column 1, lines 60 to 75, the formula D should appear as shown below:

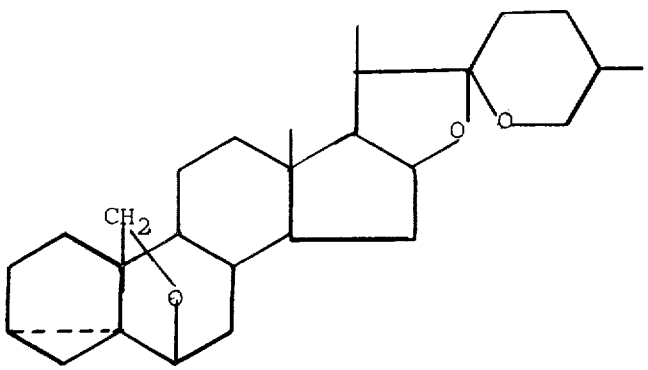

Column 2, lines 65 to 75, the last formula should appear as shown below:

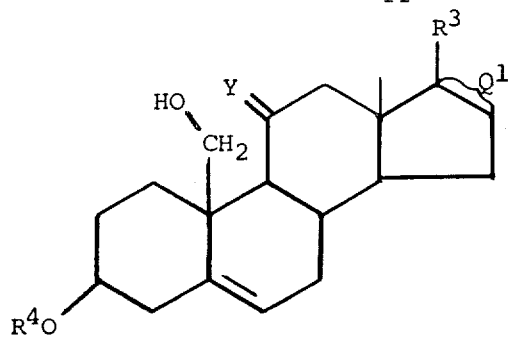

Column 4, line 36, "3.5-" should read -- 3,5- --; line 38, "imneral" should read -- mineral --. Column 5, lines 58 and 59, cancel "then with an aqueous solution of sodium bicarbonate,". Column 7, in the table, the third, fourth and fifth named compounds in column 1 should respectively read -- 17,20;20,21-bismethylenedioxy-$\Delta^5$-pregnen-3β-ol-11-one --, -- 17,20;20,21-bis-methylenedioxy-$\Delta^5$-pregnen-3β-ol -- and -- $\Delta^5$-pregnene-3β,17α-diol-20-one-17-acetate --; same column, same table, the third last named compound should read -- 16β-methyl-$\Delta^5$-pregnene-3β,17α-diol-20-one-17-acetate --; same column 7, line 36, "2,5-cyclo-" should read -- 3,5-cyclo- --; line 68, "-$\Delta^3$" should read -- -$\Delta^5$ --. Column 10, line 14, "$\Delta^{26}$" should read -- $\Delta^{16}$ --.

Signed and sealed this 7th day of April 1970.

(SEAL)
Attest:

EDWARD M. FLETCHER, JR.                                 WILLIAM E. SCHUYLER, JR.
Attesting Officer                                                 Commissioner of Patents